(12) United States Patent
Yao et al.

(10) Patent No.: US 8,621,514 B2
(45) Date of Patent: Dec. 31, 2013

(54) APPARATUS, SYSTEMS AND METHODS FOR A VIDEO THUMBNAIL ELECTRONIC PROGRAM GUIDE

(75) Inventors: Kevin Yao, Cheyenne, WY (US); Jeffrey McSchooler, Parker, CO (US)

(73) Assignee: EchoStar Broadcasting Corporation, Englewood, CO (US)

( * ) Notice: Subject to any disclaimer, the term of this patent is extended or adjusted under 35 U.S.C. 154(b) by 286 days.

(21) Appl. No.: 12/821,340

(22) Filed: Jun. 23, 2010

(65) Prior Publication Data

US 2011/0321095 A1 Dec. 29, 2011

(51) Int. Cl.
*H04N 5/445* (2011.01)

(52) U.S. Cl.
USPC ................................ 725/41; 725/44; 348/564

(58) Field of Classification Search
USPC .............. 725/37–61; 348/564–569, 731, 732, 348/906
See application file for complete search history.

(56) References Cited

U.S. PATENT DOCUMENTS

| | | | |
|---|---|---|---|
| 6,421,067 B1 | 7/2002 | Kamen et al. | |
| 6,870,573 B2 * | 3/2005 | Yeo et al. | 348/569 |
| 7,509,580 B2 * | 3/2009 | Sezan et al. | 715/719 |
| 7,685,619 B1 | 3/2010 | Herz | |
| 2002/0059584 A1 | 5/2002 | Ferman et al. | |
| 2002/0166122 A1 | 11/2002 | Kikinis et al. | |
| 2002/0171686 A1 | 11/2002 | Kamen et al. | |
| 2006/0064716 A1 | 3/2006 | Sull et al. | |
| 2007/0192791 A1 | 8/2007 | Sullivan et al. | |
| 2008/0072260 A1 * | 3/2008 | Rosin et al. | 725/56 |
| 2008/0270449 A1 | 10/2008 | Gossweiler et al. | |
| 2009/0199241 A1 | 8/2009 | Unger et al. | |
| 2009/0265739 A1 | 10/2009 | Arora et al. | |
| 2011/0138416 A1 * | 6/2011 | Kang et al. | 725/39 |

FOREIGN PATENT DOCUMENTS

| | | |
|---|---|---|
| WO | 99/63753 A1 | 12/1999 |
| WO | 2004/056098 A1 | 7/2004 |

* cited by examiner

*Primary Examiner* — Annan Shang
(74) *Attorney, Agent, or Firm* — Lowe Graham Jones PLLC

(57) ABSTRACT

Video thumbnail electronic program guide (EPG) systems and methods are operable to include a video thumbnail. An exemplary embodiment receives a media content stream at a media device; picks a plurality of still image video frames from the received media content stream, wherein each still image video frame has information that is sufficient to construct the still image video frame; generate a plurality of still image video frame thumbnails, wherein each of the still image video frame thumbnails correspond to one of the still image video frames; generate a video thumbnail from the plurality of still image video frame thumbnails; and incorporate the video thumbnail with at least one program descriptor and a channel identifier associated with the media content stream into the video thumbnail EPG.

18 Claims, 3 Drawing Sheets

US 8,621,514 B2

APPARATUS, SYSTEMS AND METHODS FOR A VIDEO THUMBNAIL ELECTRONIC PROGRAM GUIDE

BACKGROUND

Media devices, such as a set top box, a television, a computer system, a game system, or the like, are configured to present program content to a user. To assist the user in selecting program content, an electronic program guide (EPG) may be presented to the user on a display. The EPG is a type of user interface that presents a menu, or a series of menus, that use a combination of text and symbols to indicate program content viewing choices that may be selected by the user. Some EPGs include a thumbnail image pertaining to the indicated program content to further assist the user in understanding the subject matter of the indicated program content. The thumbnail image may be a single frame or other still image that may be selected from and/or that may be related to the indicated program content.

However, the thumbnail image in combination with the text and the symbols may not adequately describe the nature of the indicated program content on the presented EPG. Even if a sufficient textual description is provided in the presented EPG, it may take some amount of time for the user to read and interpret the EPG information. Accordingly, there is a need in the arts to more efficiently present information in an EPG that may be more quickly understood by the user.

SUMMARY

Systems and methods of generating a video thumbnail electronic program guide (EPG) that include at least one video thumbnail are disclosed. An exemplary embodiment receives a media content stream at a media device; picks a plurality of still image video frames from the received media content stream, wherein each still image video frame has information that is sufficient to construct the still image video frame; generate a plurality of still image video frame thumbnails, wherein each of the still image video frame thumbnails correspond to one of the still image video frames; generate a video thumbnail from the plurality of still image video frame thumbnails; and incorporate the video thumbnail with at least one program descriptor and a channel identifier associated with the media content stream into the video thumbnail EPG.

BRIEF DESCRIPTION OF THE DRAWINGS

Preferred and alternative embodiments are described in detail below with reference to the following drawings.

DETAILED DESCRIPTION

Figure 1:
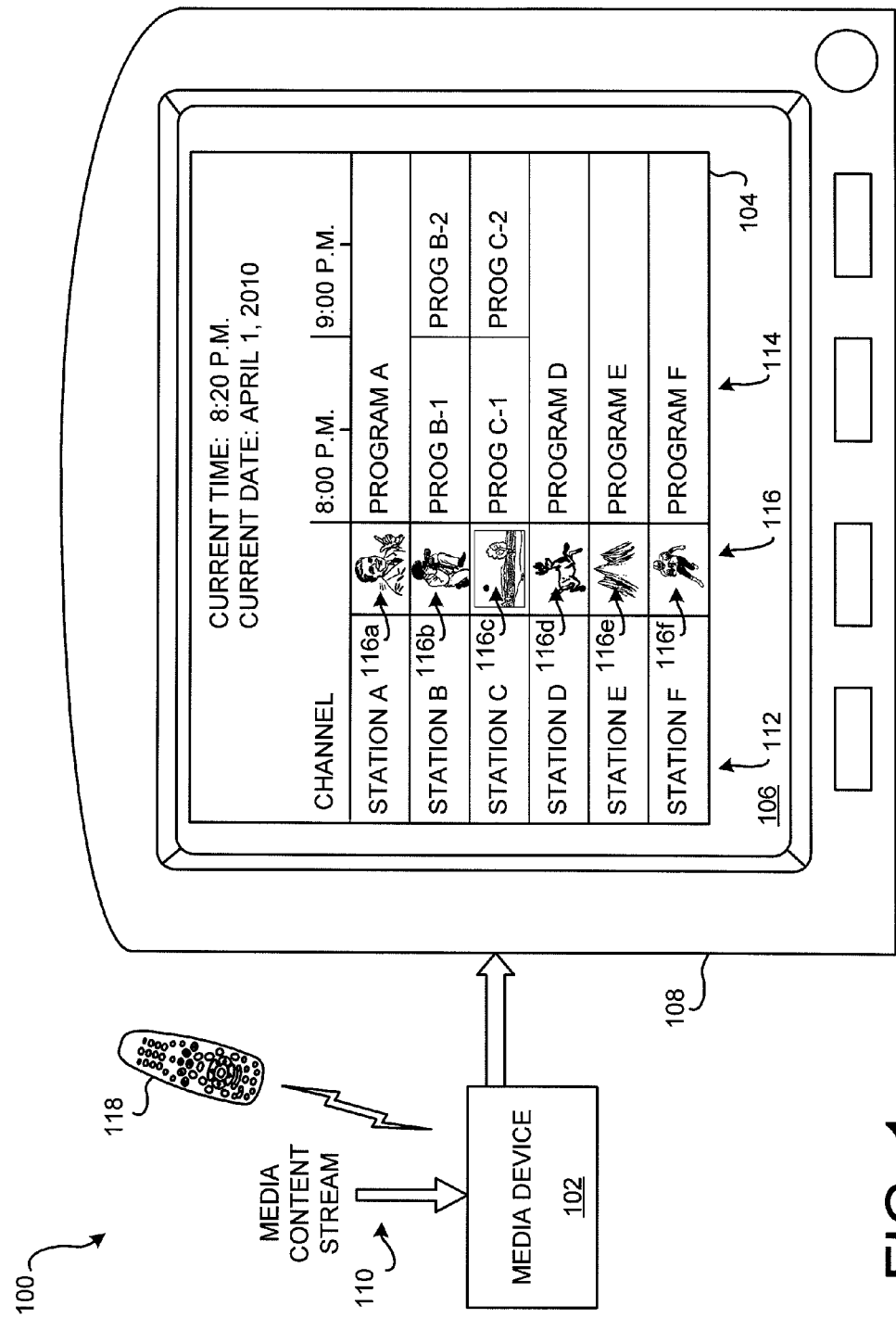
FIG. 1 is a block diagram of an exemplary embodiment of a video thumbnail electronic program guide (EPG) system implemented in an exemplary media device.

FIG. 1 is a block diagram of an exemplary embodiment of a video thumbnail electronic program guide (EPG) system 100 implemented in a media device 102, such as, but not limited to, a set top box (STB). Embodiments of the video thumbnail EPG system 100 may be implemented in other media devices, such as, but not limited to, televisions (TVs), digital video disc (DVD) players, digital video recorders (DVRs), game playing devices, personal computers (PCs), or portable media devices that are configured to present a video thumbnail EPG 104 on a display 106 of a media presentation device 108.

Embodiments of the video thumbnail EPG system 100 process a plurality of received media content streams 110 to generate a plurality of relatively small sized video clips that are combined with, or are otherwise added to, the EPG information that describes available program content. Accordingly, the exemplary video thumbnail EPG system 100 comprises a listing of channel identifiers 112 that identify the programming available on selected ones of the received media content streams 110, a program descriptor 114 providing textual information describing the program content on corresponding listed channels, and a video thumbnail 116 that presents a relatively small sized video clip of selected video content corresponding to one of the received media content streams 110.

In an exemplary embodiment, a series of consecutive still image video frames are selected from one of the received media content streams 110. Each selected still image video frame is compressed into a still image video frame thumbnail. In an exemplary embodiment, the generated still image video frame thumbnails are saved for later presentation. When the video thumbnail EPG 104 is presented, the series of still image video frame thumbnails are retrieved and a video thumbnail 116 is constructed therefrom by serially presenting the retrieved still image video frame thumbnails.

A selected still image video frame is characterized as having a complete set of video information that is sufficient to construct a still image video frame thumbnail. For example, the received media content streams 110 may be communicated to the media device 102 using one of the motion picture experts group (MPEG) standards. The MPEG intra-coded frames (I-frames) are "still image" frames that have a complete set of video information. Other MPEG frames have less video information, and may be reconstructed by the media device 102 based upon a related I-frame.

As a currently processed MPEG media content stream 110 provides an I-frame in the stream of video frames, that I-frame may be picked from the received media content stream 110. The picked I-frame is compressed into a still image video frame thumbnail, and is stored. In an exemplary embodiment, as a next one of the I-frames arrives at the media device 102, that I-frame is picked from the received media content stream 110, is compressed, and is stored. After some duration, a sequential series of I-frame type still image video frame thumbnails have been generated and saved such that the video thumbnail 116 may be generated. The video thumbnail 116 may then be incorporated into a presented video thumbnail EPG 104 such that the user views the short video thumbnail 116 of the program content on corresponding channels that are listed on the presented video thumbnail EPG 104. That is, the user is presented a thumbnail video clip derived from previously received program content for the currently presented program.

An exemplary media content stream 110 formatted under an MPEG standard may, for example, have an I-frame in the content stream approximately every second. Accordingly, the video thumbnail 116 may be comprised of a series of still image video frame thumbnails that are presented at a rate of approximately one frame per second. In comparison with a typical frame rate of thirty frames per second, the exemplary video thumbnail 116 may present a video clip that is relatively choppy. For example, the motion of a moving person may appear rather "jerky" in the presented video thumbnail 116. However, the user will perceive sufficient information to gain an improved understanding of the subject matter of the program listed on the presented video thumbnail EPG 104.

Any MPEG standard, or other video standard, may be used to compress the communicated video information residing in the media content streams 110. In situations where the media content stream 110 communicates video frames that are all independently reproducible, or where there are a large number of such video frames provided, embodiments may be configured to selectively pick ones of the complete video frames from the media content stream 110 based on a predefined duration or based upon a specified number of frames (e.g.: pick every third frame).

Audio information, in an exemplary embodiment, is not picked from the media content stream 110. In such embodiments, audio information is not presented with the video thumbnail 116. In an alternative embodiment, video information is picked from the media content stream 110 and is saved. The user may selectively listen to the audio portion of the video thumbnail 116.

An exemplary video thumbnail EPG 104 comprises a series of rows corresponding to information that identifies one of the received media content streams 110. Each of the rows are subdivided into portions that form columns of related information. In the exemplary video thumbnail EPG 104, the first left hand column corresponds to channel identifiers 112 that are uniquely assigned to each one of the received media content streams 110. The second column presents the generated video thumbnail 116 that corresponds to that particular one of the received media content streams 110. The remaining portion of the video thumbnail EPG 104 corresponds to columns arranged by time of day. Below the time of day columns, the program descriptors 114 present selected program information pertaining to that particular one of the received media content streams 110. Presented program information may include, for example, the title of the program that is currently being presented in that particular one of the received media content streams 110. Other information of interest may also be presented. An end of the current program may be identified by the time at which a transition to a new program title begins.

Alternative embodiments may present the channel identifiers 112, the program descriptors 114 and the generated video thumbnail 116 in a different order. For example, the video thumbnails 116 may be presented on the far left hand side of the video thumbnail EPG 104.

The generated video thumbnail 116 illustrated in the exemplary video thumbnail EPG 104 is relatively small. Actual size of the presented video thumbnail 116 will vary depending upon the size of the display 106 and/or the number of programs listed on the video thumbnail EPG 104. In some embodiments, the user may highlight or otherwise select a particular one of the video thumbnails 116 presented on the video thumbnail EPG 104. Upon highlighting or selecting, the size of the video thumbnail 116 may be increased to improve visibility of the video thumbnail 116 to the user.

In the illustrative video thumbnail EPG 104, the top row of the exemplary video thumbnail EPG 104 indicates that "Station A" is currently presenting a "Program A" that started at 8:00 p.m. on the current date, Apr. 1, 2010. A video thumbnail 110a (illustrating a talking man) is presented between the channel identifier 112 and the program descriptor 114. The video thumbnail 110a imparts information that may assist the user in ascertaining their level of interest in the Program A. For example, in the video thumbnail 110a, the man may be a famous recognizable actor performing a dialogue scene. If the user enjoys programs with that particular actor, they will readily appreciate that the program may be of interest. Accordingly, the user may choose to select Program A for presentation by suitably navigating about the video thumbnail EPG 104 and selecting that program for presentation using their remote control 118.

The next row of the exemplary video thumbnail EPG 104 indicates that "Station B" is currently presenting a "Program B-1" that started on or before 8:00 p.m., and is scheduled to conclude at 9:00 p.m. The video thumbnail 116b is of a person taking a photograph. The video thumbnail 116b may present actions by the photographer, and then might switch to the subject being photographed, to impart that the subject matter of Program B-1 pertains to a photography program.

Upon the conclusion of the presentation of the Program B-1, the Program B-2 is scheduled for presentation. When the currently presented Program B-1 concludes, the still image video frame thumbnails for the video thumbnail 116b may be optionally deleted. Alternatively, the still image video frame thumbnails for the video thumbnail 116b may be retained for later use, such as in instances where the Program B-1 is scheduled for later presentation. At that time, when the Program B-2 is being presented, a still image video frame thumbnails derived from the program content for Program B-2 will be used for the video thumbnail 116b.

The next row of the exemplary video thumbnail EPG 104 indicates that "Station C" is currently presenting a "Program C-1" that started on or before 8:00 p.m., and is scheduled to conclude at 9:00 p.m. The video thumbnail 116c is of a panoramic landscape scene. The video thumbnail 116c may present a panning view of the landscape scene to impart, for example, that the subject matter of Program C-1 pertains to a travel documentary program.

The next row of the exemplary video thumbnail EPG 104 indicates that "Station D" is currently presenting a "Program D" that started on or before 8:00 p.m., and is scheduled to conclude at, or after, 9:00 p.m. The video thumbnail 116d is of a running deer. The video thumbnail 116d may impart, for example, that the subject matter of Program D pertains to a wildlife program or a hunting program. Some embodiments of the video thumbnail EPG system 100 are configured to update the video thumbnail 116d using a newer generated series of still image video frame thumbnails. That is, the video thumbnail 116d may correspond to an earlier received portion of the received media content stream 110 corresponding to the Program D. As a current portion of the media content stream 110 for the Program D is received, a series of newly received consecutive still image video frames are picked from the content stream and are compressed into a series of new still image video frame thumbnails. When a sufficient number of new still image video frame thumbnails are saved, a new video thumbnail 116d may be presented on the video thumbnail EPG 104.

The next row of the exemplary video thumbnail EPG 104 presents the video thumbnail 116e of a mountain to indicate that "Station E" is currently presenting a "Program E" with the subject matter pertaining to a mountain climbing program or a skiing program, for example. The last row of the exemplary video thumbnail EPG 104 presents the video thumbnail 116f of a running football player to indicate that "Station F" is currently presenting a "Program F" that corresponds to a football game or related sports program.

Like conventional EPGs, the user may navigate about the video thumbnail EPG 104 in any suitable manner. For example, a program of interest may be selected depending upon the user's interest. The user may scroll up or down the video thumbnail EPG 104 to view information for additional ones of the received media content streams 110 using their remote control 118.

Alternative embodiments of the video thumbnail EPG 104 may present available programming on less than, or more than, the exemplary six program channels illustrated in FIG. 1. Some embodiments may be configured to present the program information and the video thumbnails 116 in a different format. For example, but not limited to, the video thumbnails 116 may be presented in a mosaic pattern or the like. Supplemental descriptive information may be optionally presented as needed so that the user better appreciates the nature of the programming represented by the presented video thumbnails 116.

Figure 2:
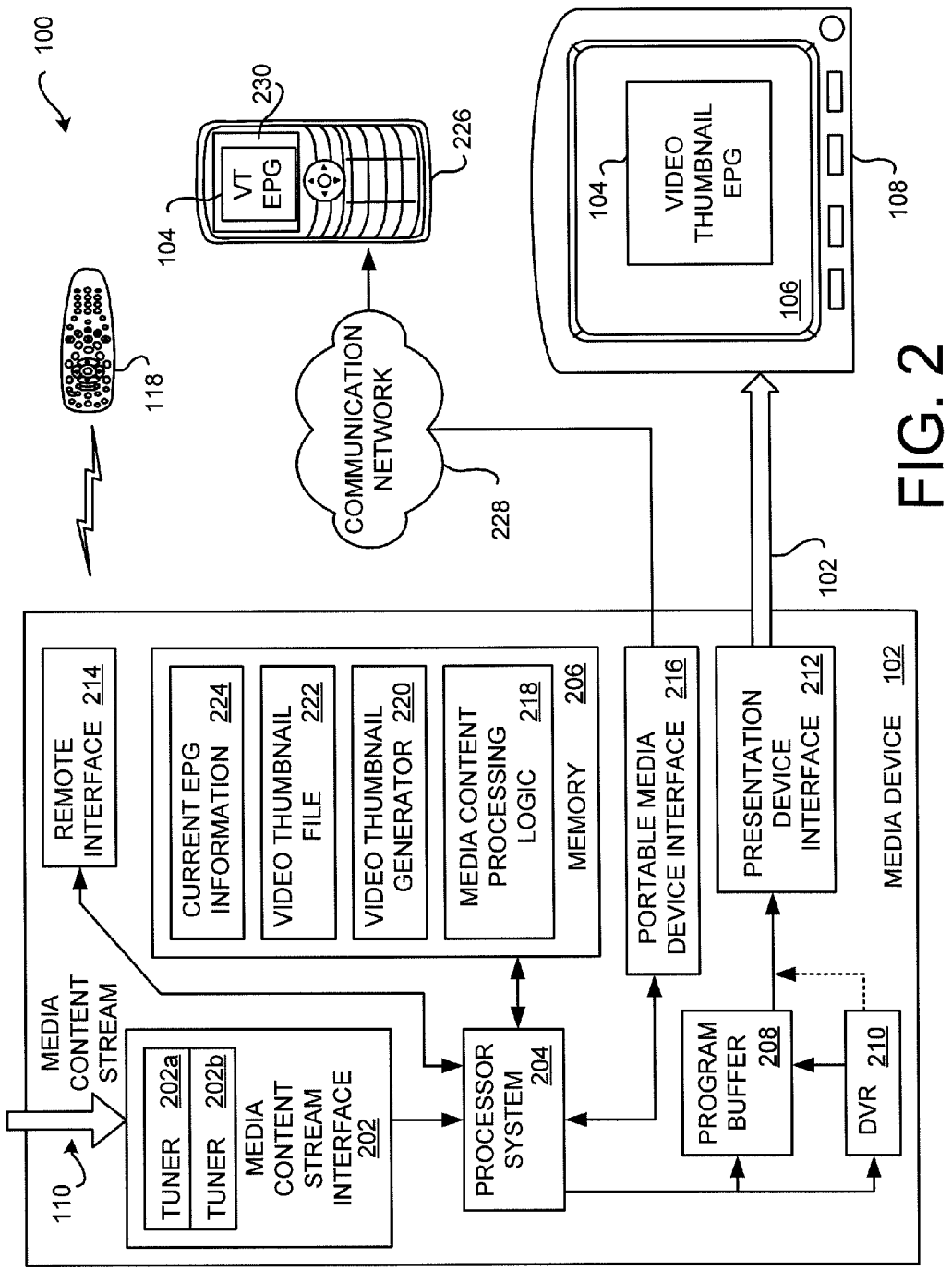
FIG. 2 is a block diagram showing greater detail of the exemplary embodiment of the video thumbnail EPG system implemented in the exemplary media device of FIG. 1.

FIG. 2 is a block diagram showing greater detail of the exemplary embodiment of the video thumbnail EPG system 100 implemented in the exemplary media device 102 of FIG. 1. The exemplary embodiment comprises a media content stream interface 202, a processor system 204, a memory 206, a program buffer 208, an optional digital video recorder (DVR) 210, a presentation device interface 212, a remote interface 214, and an optional portable media device interface 216. The memory 206 comprises portions for storing media content processing logic 218, a video thumbnail generator 220, a video thumbnail file 222 configured to store the plurality of still image video frame thumbnails and/or the generated video thumbnails 116, and current EPG information 224. In some embodiments, the media content processing logic 218 and the video thumbnail generator 220 may be integrated together, and/or may be integrated with other logic. In some embodiments, the video thumbnail file 222 and the current EPG information 224 may be integrated together. Other media devices may include some, or may omit some, of the above-described media processing components. Further, additional components not described herein may be included in alternative embodiments.

The functionality of the media device 102, here a set top box, is now broadly described. A media content provider provides program content that is received in one or more media content streams 110 multiplexed together into one or more transport channels. The transport channels with the media content streams 110 are communicated to the media device 102 via a media system sourced from a remote head end facility (not shown) operated by the media content provider. Non-limiting examples of such media systems include satellite systems, cable system, and the Internet. For example, if the media content provider provides programming via a satellite-based communication system, the media device 102 is configured to receive one or more broadcasted satellite signals detected by an antenna (not shown). Alternatively, or additionally, the media content stream 110 can be received from one or more different sources, such as, but not limited to, a cable system, a radio frequency (RF) communication system, or the Internet.

The one or more media content streams 110 are received by the media content stream interface 202. One or more tuners 202a, 202b in the media content stream interface 202 selectively tune to one of the received media content streams 110 in accordance with instructions received from the processor system 204. The processor system 204, executing the media content processing logic 218 and based upon a request for a program of interest specified by a user, parses out program content associated with the program of interest. The program of interest is then assembled into a stream of video and/or audio information which may be stored by the program buffer 208 such that the program content can be streamed out to the media presentation device 108, such as the exemplary television, via the presentation device interface 212. Alternatively, or additionally, the parsed out program content may be saved into the DVR 210 for later presentation.

From time to time, information populating the current EPG information 224 is communicated to the media device 102, via a special media content stream 110 or via another suitable media. The current EPG information 224 stores the information pertaining to currently scheduled programming. The current EPG information 224 may include, but is not limited to, a scheduled presentation start and/or end time, a program channel, and descriptive information. The program's descriptive information may include the title of the program, names of performers or actors, date of creation, and a summary describing the nature of the program. Any suitable information may be included in the program's supplemental information.

The above processes performed by the media device 102 are generally implemented by the processor system 204 while executing the media content processing logic 218. Thus, the media device 102 may perform a variety of functions, including preparing program content for presentation on the display 106 of the media presentation device 108.

The processor system 204 executes the video thumbnail generator 220 to pick selected still image video frames from one of the received media content streams 110. The picked still image video frames, such as the exemplary I-frames, are each compressed into the still image video frame thumbnail in accordance with a suitable video information processing algorithm stored in the video thumbnail generator 220.

Upon receipt of a command from the user requesting presentation of the video thumbnail EPG 104, the program schedule information residing in the current EPG information 224 is retrieved, formatted, and integrated with corresponding ones of the video thumbnails 116 stored in the video thumbnail file 222. The video thumbnail EPG 104 may then be presented on the display 106.

Some embodiments may include the optional portable media device interface 216 that communicatively couples the media device 102 to another electronic device, such as the portable media device 226, via a communication network 228. Non-limiting examples of the portable media device 226 include a cellular phone, a personal device assistant (PDA), a laptop computer, or the like. The video thumbnail EPG 104 may be communicated to the portable media device 226 for presentation on its display 230.

The communication network 228 is illustrated as a generic communication system. In one embodiment, the communication network 228 comprises a radio frequency (RF) wireless system. Accordingly, the portable media device interface 216 is a suitable cellular transmitter. Alternatively, the communication network 146 may be a telephony system, the Internet, a microwave communication system, a fiber optics system, an intranet system, a local access network (LAN) system, a local network, an Ethernet system, a cable system, a radio frequency system, a cellular system, an infrared system, a satellite system, or a hybrid system comprised of multiple types of communication media. Alternative portable media device interfaces 216 may be configured to provide connectivity to any suitable communication network 228.

When the media device 102 is not currently used for program presentation and/or recording, the tuners 202a and 202b will not be actively retrieving a media content stream 110 for presentation and/or recording. Embodiments of the thumbnail EPG system 100 may be configured to use one or both of the tuners 202a and 202b to pick still image video frames from a selected media content stream 110. For example, the tuner 202a may be receiving a first media content stream 110 from which the still image video frames are picked from. Concurrently, the tuner 202b may be receiving a second media content stream 110 from which still image video frames are picked from. The processor system 204 receives the picked still image video frames, generates the associated still image video frame thumbnails, and saves them into the video thumbnail file 222. The saved image video frame thumbnails may be later retrieved and assembled into a video thumbnail 116. Accordingly, the first series of still image video frame thumbnails picked off by the first tuner 202a from the first media content stream 110 may be saved to later generate a first video thumbnail 116. The second series of still image video frame thumbnails picked off by the second tuner 202a from the second media content stream 110 may be saved to later generate a second video thumbnail 116.

Alternatively, a first video thumbnail 116 associated with the first media content stream 110 may be generated and saved into the video thumbnail file 222. A second video thumbnail 116 associated with the second media content stream 110 may be generated and saved into the video thumbnail file 222.

The video thumbnails 116 are of a relatively short duration. An exemplary embodiment generates video thumbnails 116 that are approximately thirty seconds long, though any suitable duration may be used. In some embodiments, durations of the various video thumbnails 116 may be different. For example, the durations of video thumbnails 116 associated with a favorites channel list and/or most frequently watched channels may have a longer duration than other video thumbnails 116.

Once the series of still image video frame thumbnails, or alternatively the video thumbnail 116, for a particular one of the media content streams 110 have been generated, a different media content stream 110 is tuned to and a new series of still image video frame thumbnails, or alternatively a new video thumbnail 116, are generated for the new media content stream 110. For example, after a sufficient number of still image video frames from the first media content stream 110 have been picked to construct the first video thumbnail 116, the tuner 202a may be re-tuned to a third media content stream 110 such that a third series of still image video frame thumbnails may be picked, or alternatively a third video thumbnail 116, are generated and saved. Similarly, after a sufficient number of still image video frames from the second media content stream 110 have been picked to construct the second video thumbnail 116, the tuner 202b may be re-tuned to a fourth media content stream 110 such that a fourth series of still image video frame thumbnails, or alternatively a fourth video thumbnail 116, are generated and saved. The process of generating video thumbnails 116 for the plurality of received media content streams 110 continues such that a plurality of video thumbnails 116 may generated.

Some embodiments are configured to generate a video thumbnail 116 for each one of the received media content streams 110. However, it is appreciated that some media content providers provide hundreds, even thousands, of different media content streams 110. In such applications, generating a video thumbnail 116 for each one of the received media content streams 110 may not be practical since there may not be a sufficient amount of time to generate video thumbnails 116 for each of the received media content streams 110. Accordingly, some embodiments of the thumbnail EPG system 100 may be configured to generate and save a video thumbnail 116 for selected ones of the received media content streams 110. Accordingly, the number of media content streams 110 for which a series of still image video frame thumbnails (or video thumbnails 116) are generated and saved is limited to a more manageable number.

For example, video thumbnails 116 for media content streams 110 associated with channels of a favorites list and/or a most watched list may be generated. In another embodiment, the media content provider may provide the same program content in a high definition (HD) format and a standard definition format. Here, a single series of still image video frame thumbnails (or a single video thumbnail 116) may be generated using one of the media content streams 110, and then used when that particular channel (HD or standard definition) is shown on the presented video thumbnail EPG 104. Some embodiments may predefine which of the media content streams 110 that the video thumbnails 116 will be generated. For example, the media content provider may define which of the media content streams 110 will have a video thumbnail 116 generated based on marketing criteria or other criteria. Alternatively, or additionally, the user may select which of the media content streams 110 will have a video thumbnail 116 generated.

Because the series of still image video frame thumbnails (or video thumbnails 116) are generated and saved prior to inclusion into a presented video thumbnail EPG 104, the presented ones of the video thumbnails 116 represent a prior presented portion of the program associated with that particular media content stream 110. When the series of still image video frame thumbnails (or video thumbnails 116) have been generated and saved for the plurality of media content streams 110, or for the selected media content streams 110, the process of generating and saving the series of still image video frame thumbnails (or video thumbnails 116) may restart. Accordingly, more current video thumbnails 116 will be available for presentation on the presented video thumbnail EPG 104. In embodiments where the series of still image video frame thumbnails (or video thumbnails 116) are being generated and saved for a limited number of media content streams 110, such as those associated with a favorites list and/or a most watched list, the video thumbnails 116 for those media content streams 110 may be relatively current, and may even be available on a near-real time basis.

Some embodiments may be configured to generate and save the series of still image video frame thumbnails (or video thumbnails 116) for selected media content streams 110 on a more frequent basis than other ones of the media content streams 110. For example, video thumbnails 116 may be generated for media content streams 110 associated with the favorites list and/or the most watched list on a more frequent basis than other media content streams 110. Accordingly, the video thumbnails 116 for the favorites list and/or the most watched list may be relatively current, while other video thumbnails 116 for the other media content streams 110 would not be as current.

When the video thumbnail EPG 104 is presented to the user, some embodiments may be configured to generate and save the series of still image video frame thumbnails (or video thumbnails 116) for those particular media content streams 110 that are currently identified on the presented video thumbnail EPG 104. For example, the presented video thumbnail EPG 104 is presenting information for media content streams 110 associated with Stations A-F in FIG. 1. Accordingly, the series of still image video frame thumbnails (or video thumbnails 116) associated with the Stations A-F are generated and saved, while the process of generating and saving the series of still image video frame thumbnails (or video thumbnails 116) for other media content streams 110 is discontinued or delayed.

Further, some embodiments may be configured to generate and save the video series of still image video frame thumbnails (or video thumbnails 116) for the media content streams 110 that are associated with channels that are adjacent to those channels presented on the video thumbnail EPG 104. For example, Station G, H and I are adjacent to Station F in the exemplary presented video thumbnail EPG 104 of FIG. 1. Accordingly, since the user may be scrolling down to view available programming on those adjacent stations at some point, video thumbnails 116 may be generated for those adjacent Stations H-I in anticipation of the user scrolling downward through the presented video thumbnail EPG 104.

When the media device 102 is currently in use for program presentation and/or recording, one of the tuners 202a and 202b will be actively retrieving a media content stream 110 for presentation and/or recording. Embodiments may be configured to utilize the remaining one of the tuners 202a and 202b to receive a selected media content stream 110 from which the still image video frames are picked. For example, the tuner 202a may be receiving the first media content stream 110 for presentation and/or recording. Accordingly, the unused tuner 202b may be receiving the second media content stream 110. That is, a video thumbnail 116 that is associated with the second media content stream 110 is generated. When that series of still image video frame thumbnails (or video thumbnail 116) have been generated and saved, the tuner 202b may be re-tuned to a different media content stream 110 so that a different series of still image video frame thumbnails (or a different video thumbnail 116) may be generated and saved for a different media content stream 110.

Some media devices 102 only have the two tuners 202a and 202b. In situations where the tuners 202a and 202b are both being used, some embodiments of the thumbnail EPG system 100 will not be able to generate and save a new series of still image video frame thumbnails (or generate a new video thumbnail 116). For example, one media content stream 110 may be currently presented to the user and another media content stream 110 may be currently recorded into the DVR 210. As another example, one media content stream 110 may be currently presented on a first media presentation device 108 and another media content stream 110 may be currently presented on a different media presentation device 108 in a different location. As yet another example, one media content stream 110 may be currently presented on the main viewing area of the display 106 of a media presentation device 108, and another media content stream 110 may be currently presented as a picture-in-picture (PIP) mode or presented using another dual image presentation mode. Accordingly, when the video thumbnail EPG 104 is presented, a current video thumbnail 116 may not be available for inclusion in the presented video thumbnail EPG 104. (However, if the series of still image video frame thumbnails or video thumbnail 116 has already been saved, the video thumbnail 116 may be incorporated into the presented video thumbnail EPG 104.)

Alternatively, some embodiments may be configured to pick I-frames from a received media content stream 110 that is being presented and/or saved into the DVR 210. The picked I-frames are compressed into a still image video frame thumbnail and saved. In the event that the video thumbnail EPG 104 is presented, the video thumbnail 116 may then be generated and incorporated into the presented video thumbnail EPG 104 for the currently presented and/or saved media content stream 110. Further, if the user changes presentation to a different media content stream 110, the video thumbnail 116 for the previously presented media content stream 110 will be available in the event that the video thumbnail EPG 104 is presented.

Some embodiments of the media device 102 may include more than two tuners. In such embodiments, the likelihood of having an unused tuner may increase. If a tuner is not being actively used to receive a media content stream 110 for another purpose, then the unused tuner may be operated to pick still image video frame thumbnails that are used to generate and save a video thumbnail 116. Some embodiments may include one or more dedicated tuners and/or processing systems that are dedicated to receiving media content streams that are used for generating video thumbnails 116.

Some embodiments may be alternatively configured to store the generated video thumbnails 116 in a different memory medium. For example, an alternative embodiment may store generated video thumbnails 116 into the DVR 210. As another example, a dedicated solid state memory device may be used to store the still image video frame thumbnails and/or the generated video thumbnails 116. The memory medium may reside in the media device 102 or may be an external memory medium that is accessibly by the media device 102.

Figure 3:
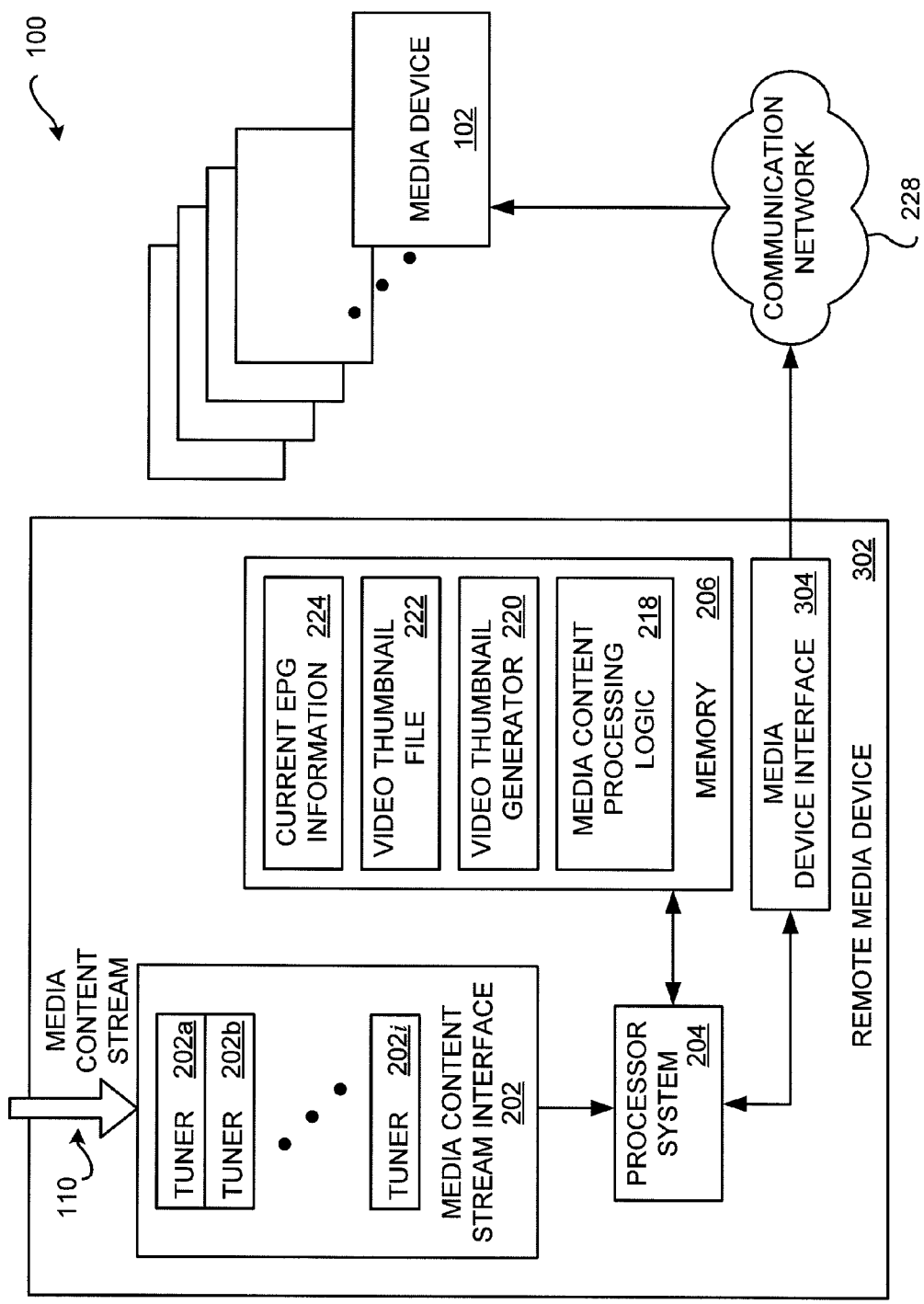
FIG. 3 is a block diagram of an alternative embodiment of the video thumbnail EPG system that is configured to receive video thumbnails from a remote media device.

FIG. 3 is a block diagram of an alternative embodiment of the video thumbnail EPG system 100 that is configured to receive video thumbnails 116 from a remote media device 302. The remote media device 302 includes a plurality of tuners 202a-202i. The media device 302 is configured to concurrently generate and save the still image video frame thumbnails and/or the video thumbnails 116 for many media content streams 110. Some embodiments of the remote media device 302 may be configured to perform other media content processing functions.

The remote media device 302 includes a media device interface 304 that is configured to communicate the generated and saved still image video frame thumbnails and/or the video thumbnails 116 to a plurality of media devices 102 via the communication network 228. When the media device 302 has a relatively large number of tuners 202i, a relatively large number of still image video frame thumbnails and/or video thumbnails 116 may be generated and saved. Further, the video thumbnails 116 may be refreshed at a faster rate to provide video thumbnails 116 having more current media content at a relatively faster rate.

The video thumbnails 116 may be communicated to the plurality of media devices 102 over a dedicated communication channel receivable by the media devices 102. Alternatively, or additionally, the video thumbnails 116 may be aggregated into a media content stream 110 and communicated to the media devices 102 along with other media content.

It should be emphasized that the above-described embodiments of the video thumbnail EPG system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method of generating a video thumbnail electronic program guide (EPG), the method comprising:
receiving a media content stream at a media device, wherein the media content stream comprises first still image video frames that have information that is sufficient to construct the first still image video frames, wherein the media content stream comprises second still image video frames that do not have information that is sufficient to construct the second still image video frames, and wherein the second still image video frames are configured to be constructed using their respective information and information from at least one of the first still image video frames;

picking a series of a plurality of first still image video frames as the first still image video frames are received from the media content stream, wherein the second still image video frames that are between the picked first still image video frames in the media content stream are not picked;

generating a plurality of still image video frame thumbnails, wherein each of the still image video frame thumbnails correspond to one of the picked first still image video frames;

generating a video thumbnail from the plurality of still image video frame thumbnails;

incorporating the video thumbnail with at least one program descriptor and channel identifier associated with the media content stream into the video thumbnail EPG; and communicating the video thumbnail EPG to a display, wherein the video thumbnail EPG with the video thumbnail is presented to a user.

2. The method of claim 1, further comprising:
storing the plurality of still image video frame thumbnails, wherein the video thumbnail is generated from the stored plurality of still image video frame thumbnails when incorporated into the video thumbnail EPG.

3. The method of claim 1, wherein the media content stream is received in a motion picture experts group (MPEG) standard, and wherein picking the plurality of first still image video frames from the received media content stream comprises:
picking a plurality of MPEG intra-coded frames (I-frames) from the received media content stream, wherein the still image video frame thumbnails are generated from the MPEG I-frames.

4. The method of claim 1, wherein picking the plurality of first still image video frames from the received media content stream comprises:
picking a predefined number of the first still image video frames from the received media content stream.

5. The method of claim 1, wherein picking the plurality of first still image video frames from the received media content stream comprises:
picking the plurality of the first still image video frames from the received media content stream for a predefined duration of time.

6. The method of claim 1, further comprising:
communicating the video thumbnail EPG to a portable media device for presentation on a display of the portable media device.

7. The method of claim 1, wherein a first media content stream includes high definition (HD) program content for a program, wherein the first media content stream is associated with a first channel identifier, wherein a second media content stream includes standard definition program content for the program, and wherein the second media content stream is associated with a second channel identifier that is different from the first channel identifier, the method comprising:
generating the video thumbnail using the series of the first still image video frames in the HD program content; and
incorporating the video thumbnail generated from the HD program content into the video thumbnail EPG when the second channel identifier is currently presented in the video thumbnail EPG.

8. The method of claim 1, wherein a first media content stream includes high definition (HD) program content for a program, wherein the first media content stream is associated with a first channel identifier, wherein a second media content stream includes standard definition program content for the program, and wherein the second media content stream is associated with a second channel identifier that is different from the first channel identifier, the method comprising:
generating the video thumbnail using the series of the first still image video frames in the standard definition program content; and
incorporating the video thumbnail generated from the standard definition program content into the video thumbnail EPG when the first channel identifier is currently presented in the video thumbnail EPG.

9. The method of claim 1, wherein the video thumbnail EPG communicated to the display for presentation is communicated from a first media device, and wherein the video thumbnail is generated at a second media device that is remote from the first media device, the method further comprising:
communicating the video thumbnail from the second media device to the first media device over a communication system,
wherein the first media device incorporates the received video thumbnail into the video thumbnail EPG.

10. The method of claim 1, further comprising:
determining a direction of channel surfing by the user viewing the video thumbnail EPG;
identifying an adjacent channel identifier of a media content stream, wherein the adjacent channel identifier is adjacent to one of the channel identifiers presented in the video thumbnail EPG, and wherein the adjacent channel identifier is initially omitted from the video thumbnail EPG;
generating an additional video thumbnail from the series of the first still image video frames in the media content stream associated with the adjacent channel identifier; and
incorporating into a new video thumbnail EPG the additional video thumbnail, a corresponding program descriptor, and the corresponding adjacent channel identifier into the new video thumbnail EPG.

11. The method of claim 1, further comprising:
receiving a user selection of one of the presented video thumbnails; and
increasing a presentation size of the selected video thumbnail in response to receiving the user selection.

12. A system for a thumbnail electronic program guide (EPG), comprising:
a first tuner configured to receive a first one of a plurality of media content streams;
a second tuner configured to receive a second one of the plurality of media content streams,
wherein the media content streams comprise a first type of still image video frames that have information that is sufficient to construct the first type of still image video frames, wherein the media content streams comprise a second type of still image video frames that do not have information that is sufficient to construct the second type of still image video frames, and wherein the second type of still image video frames are configured to be constructed using their respective information and information from at least one of the first type of still image video frames;
a processor system communicatively coupled to the first tuner and the second tuner, and configured to:
pick a series of a plurality of first still image video frames from the first type of still image video frames in the received first media content stream, wherein the second type of still image video frames that are between the picked first type of still image video frames are not picked;

pick a series of a plurality of second still image video frames from the first type of still image video frames in the received second media content stream, wherein the second type of still image video frames that are between the picked first type of still image video frames are not picked;

generate a plurality of first still image video frame thumbnails, wherein each of the first still image video frame thumbnails correspond to one of the picked first type of still image video frames;

generate a plurality of second still image video frame thumbnails, wherein each of the second still image video frame thumbnails correspond to one of the picked second type of still image video frames;

generate a first video thumbnail from the plurality of first still image video frame thumbnails;

generate a second video thumbnail from the plurality of second still image video frame thumbnails;

incorporate the first video thumbnail with at least one first program descriptor and a first channel identifier associated with the first media content stream into the video thumbnail EPG; and incorporate the second video thumbnail with at least one second program descriptor and a second channel identifier associated with the second media content stream into the video thumbnail EPG; and a presentation device interface communicatively coupled to the processor system, and configured to communicate the video thumbnail EPG to a presentation device with a display, wherein the video thumbnail EPG is presented to a user, wherein after communication of the video thumbnail EPG to the presentation device, the processor system is further configured to:

determine a direction of channel surfing by the user viewing the video thumbnail EPG;

identify an adjacent channel identifier of a media content stream, wherein the adjacent channel identifier is adjacent to a channel identifier presented in the video thumbnail EPG, and wherein the adjacent channel identifier is currently omitted from the video thumbnail EPG;

generate an additional video thumbnail from a series of the first type of still image video frames in the media content stream associated with the adjacent channel identifier;

incorporate the additional video thumbnail into a new video thumbnail EPG; and communicate the new video thumbnail EPG to the display in response to further channel surfing by the user, wherein the new video thumbnail EPG with the video thumbnail is presented to the user.

13. The system of claim 12, further comprising:
a memory communicatively coupled to the processor system,
wherein the memory is configured to store at least the first video thumbnail and the associated program descriptor, and store the second video thumbnail and the associated program descriptor,
wherein the video thumbnail EPG is a first video thumbnail EPG that is presented on a display at a first time,
and wherein the processor system is further configured to:
generate a second video thumbnail EPG at a second time, wherein the second time is later than the first time that the first video thumbnail EPG is generated;

identify a plurality of channel identifiers that are to be presented on the second video thumbnail EPG;

access from an EPG a plurality of program descriptors associated with each one the identified plurality of channel identifiers that are to be presented on the second video thumbnail EPG;

identify ones of the stored program descriptors that are the same as the accessed program descriptors;

retrieve corresponding stored video thumbnails from the memory that are associated with the identified ones of the stored program descriptors that are the same as the accessed program descriptors; and incorporate the retrieved stored video thumbnails into the second video thumbnail EPG, wherein the new video thumbnail EPG is communicated to the presentation device in response to further channel surfing by the user.

14. The system of claim 12, further comprising:
a remote interface configured to receive a wireless signal from a remote control, wherein the wireless signal corresponds to a user selection of one of the presented video thumbnails,
wherein the processor system is further configured to increase a presentation size of the selected video thumbnail.

15. A system that generates a video thumbnail electronic program guide (EPG), comprising:
a first tuner configured to receive a first one of a plurality of media content streams;
a second tuner configured to receive a second one of the plurality of media content streams,
wherein the media content streams comprise a first type of still image video frames that have information that is sufficient to construct the first type of still image video frames, wherein the media content streams comprise a second type of still image video frames that do not have information that is sufficient to construct the second type of still image video frames, and wherein the second type of still image video frames are configured to be constructed using their respective information and information from at least one of the first type of still image video frames;

a processor system communicatively coupled to the first tuner and the second tuner, and configured to:
pick a series of a plurality of first still image video frames from the first type of still image video frames in the received first media content stream, wherein the second type of still image video frames that are between the picked first type of still image video frames are not picked;

pick a series of a plurality of second still image video frames from the first type of still image video frames in the received second media content stream, wherein the second type of still image video frames that are between the picked first type of still image video frames are not picked;

generate a plurality of first still image video frame thumbnails, wherein each of the first still image video frame thumbnails correspond to one of the first still image video frames;

generate a plurality of second still image video frame thumbnails, wherein each of the second still image video frame thumbnails correspond to one of the second still image video frames;

generate a first video thumbnail from the plurality of first still image video frame thumbnails;

generate a second video thumbnail from the plurality of second still image video frame thumbnails;

incorporate the first video thumbnail with at least one first program descriptor and a first channel identifier associated with the first media content stream into the video thumbnail EPG; and incorporate the second video thumbnail with at least one second program descriptor and a second channel identifier associated with the second media content stream into the video thumbnail EPG; and a portable media device interface communicatively coupled to the processor system and configured to communicatively couple to a communication network, wherein the processor system is further configured to communicate the video thumbnail EPG, through the portable media device interface and over the communication network, to a portable media device for presentation on a display of the portable media device.

16. A method for a video thumbnail electronic program guide (EPG), the method comprising:

receiving a plurality of media content streams at a media device, wherein the media content streams comprise a first type of still image video frames that have information that is sufficient to construct the first type of still image video frames, wherein the media content streams comprise a second type of still image video frames that do not have information that is sufficient to construct the second type of still image video frames, and wherein the second type of still image video frames are configured to be constructed using their respective information and information from at least one of the first type of still image video frames;

receiving a request to present an EPG, wherein the EPG is initially configured to present information for a plurality of channels;

selecting ones of the received media content streams that correspond to the plurality of channels of the EPG;

picking a series of a plurality of still image video frames from the first type of still image video frames in the selected ones of the received media content streams, wherein the second type of still image video frames that are between the picked first type of still image video frames are not picked;

generating a plurality of still image video frame thumbnails associated with the selected media content streams, wherein each of the still image video frame thumbnails correspond to one of the first type of still image video frames;

generating a video thumbnail associated with each of the selected media content streams from the plurality of still image video frame thumbnails;

incorporating into the video thumbnail EPG selected ones of the video thumbnails with at least one corresponding program descriptor and a corresponding channel identifier associated with the selected media content stream;

communicating the video thumbnail EPG to a display, wherein the video thumbnail EPG with the video thumbnail is presented to a user, wherein after presentation of the video thumbnail EPG, the method further comprising:

determining a direction of channel surfing by the user viewing the video thumbnail EPG;

identifying an adjacent channel identifier of a media content stream, wherein the adjacent channel identifier is adjacent to one of the channel identifiers presented in the video thumbnail EPG, and wherein the adjacent channel identifier is currently omitted from the video thumbnail EPG;

generating an additional video thumbnail from the media content stream associated with the adjacent channel identifier;

incorporating the additional video thumbnail into a new video thumbnail EPG; and communicating the new video thumbnail EPG to the display in response to further channel surfing by the user, wherein the new video thumbnail EPG with the video thumbnail is presented to the user.

17. The method of claim 16, further comprising:

identifying a plurality of favorite channels, wherein only the plurality of the favorite channels are used to generate the video thumbnail EPG, wherein the video thumbnails are generated only for the identified plurality of favorite channels.

18. The method of claim 16, further comprising:

receiving a user selection of one of the presented video thumbnails; and increasing a presentation size of the selected video thumbnail in response to receiving the user selection.

* * * * *